(12) United States Patent
Schubert et al.

(10) Patent No.: US 8,130,060 B2
(45) Date of Patent: Mar. 6, 2012

(54) ELECTRIC CIRCUIT

(75) Inventors: Goeran Schubert, Schwabach (DE); Wolfgang Huppmann, Nuremberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 341 days.

(21) Appl. No.: 12/311,758

(22) PCT Filed: Oct. 17, 2007

(86) PCT No.: PCT/DE2007/001848
§ 371 (c)(1),
(2), (4) Date: Apr. 9, 2009

(87) PCT Pub. No.: WO2008/049391
PCT Pub. Date: May 2, 2008

(65) Prior Publication Data
US 2010/0026422 A1    Feb. 4, 2010

(30) Foreign Application Priority Data

Oct. 23, 2006   (DE) .................. 10 2006 050 267

(51) Int. Cl.
*H01P 7/00*    (2006.01)
*H03H 7/00*    (2006.01)
(52) U.S. Cl. ........................... 333/181; 333/235
(58) Field of Classification Search ............. 333/181, 333/235, 167
See application file for complete search history.

(56) References Cited

U.S. PATENT DOCUMENTS

| 6,249,156 B1 | 6/2001 | Attwood |
| 6,756,874 B2 * | 6/2004 | Buckles et al. ............... 336/180 |
| 2006/0158127 A1 | 7/2006 | Xu |

FOREIGN PATENT DOCUMENTS

| FR | 2 592 749 | 7/1987 |
| WO | WO 03/012965 | 2/2003 |

OTHER PUBLICATIONS

James C Bach, "Integrated Circuit Ferrite Bead Strip and Wafer", Research Disclosure, Mason Publications, Hampshire, GB, vol. 309, No. 37, Jan. 1990, 1 page and 2 figures.
Tae Hong Kim et al., "3 Ghz Wide Frequency Model of Ferrite Bead for Power/Ground Noise Simulation of High-Speed PCB", Electrical Performance of Electronic Packaging, Piscataway, NJ, USA, Oct. 21, 2002, p. 217-220.
PCT, International Preliminary Report on Patentability for Application No. PCT/DE2007/001848, dated Apr. 28, 2009, 4 pages, International Bureau of WIPO, Geneva Switzerland.
International Preliminary Report on Patentability for Application No. PCT/DE2007/001848, dated May 5, 2009, 7 pages, International Bureau of WIPO, Geneva, Switzerland.

* cited by examiner

*Primary Examiner* — Robert Pascal
*Assistant Examiner* — Kimberly Glenn
(74) *Attorney, Agent, or Firm* — W. F. Fasse; W. G. Fasse

(57) ABSTRACT

In a circuit arrangement (1) for detuning a resonant circuit formed of an inductively acting electric circuit (14) and a capacitively acting discharging device (15), a detuning device (16) is arranged at least partially in series to the discharging device (15). The resonant circuit can be detuned in wide ranges by means of such a detuning device (16).

19 Claims, 1 Drawing Sheet

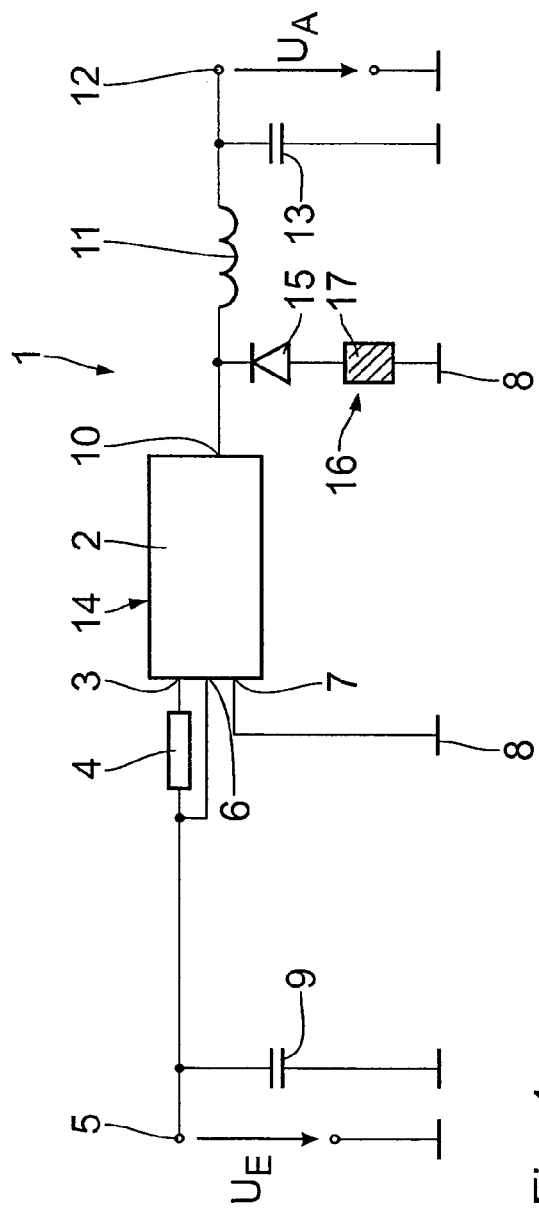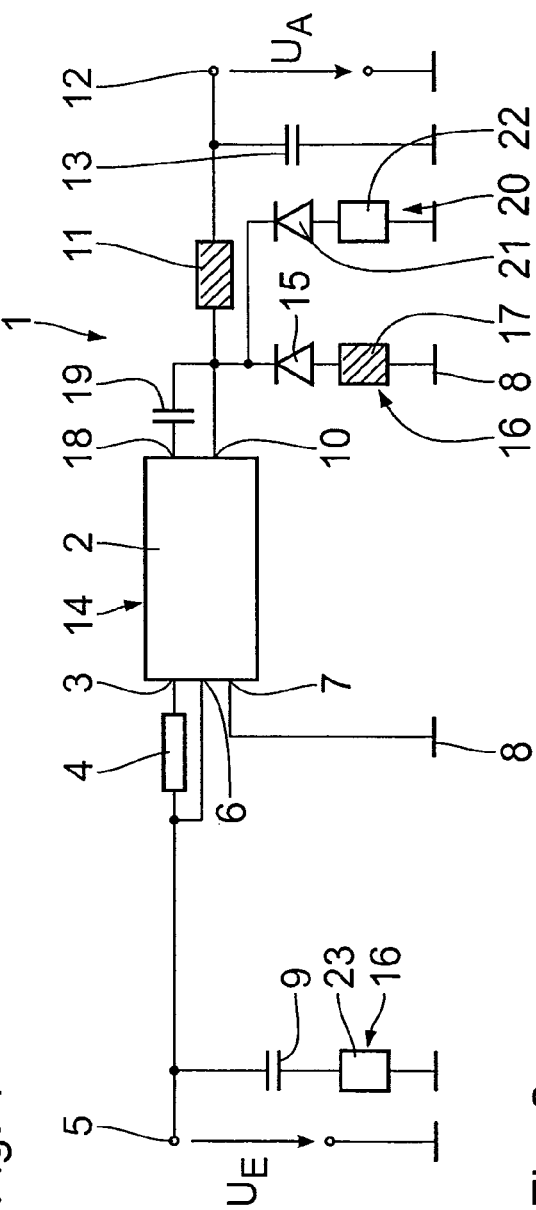
Fig. 1
Fig. 2

ELECTRIC CIRCUIT

FIELD OF THE INVENTION

The invention relates to an electric circuit for the detuning of a resonant circuit.

BACKGROUND INFORMATION

When connecting or forward-driving through a diode, at first the junction capacitance of the diode must be discharged and subsequently the flow capacity of the diode must be charged. On the other hand, when blocking the diode, this procedure must be reversed. Due to the geometry of their conductor lines, electric circuits always have an inductance, which forms a resonant circuit with the capacitances of the diode. In addition, the electric circuit can contain further inductances, for example in switching regulators, which cause an inductance increase in the electric circuit. The resonant circuit formed by the inductances and capacitances has one or more resonant frequencies, which as a rule are considered to be disturbing or interfering. Particularly disturbing are resonant frequencies of resonant circuits that are formed from an inductive electric circuit with a periodically connected or switched diode.

In order to reduce the effects of resonant frequencies, it is known to connect in series a capacitor and an ohmic resistor parallel to the diode. By the higher total capacitance of the electric circuit, the resonant frequency is shifted towards lower frequencies, where it is considered to be less disturbing. The quality of the resonant circuit is reduced by the additional capacitor and the ohmic resistor.

It is disadvantageous with the described series connection of a capacitor and an ohmic resistor that a detuning of the resonant circuit is possible only to a limited extent. The ohmic resistor must be selected to be so low that the amount of the impedance of the series connection of capacitor and ohmic resistor is in the range of the amount of the impedance of the diode capacity. Thus the value of the ohmic resistor is limited to a few ohms. In addition the capacitance of the capacitor may not be selected to be too high, as the capacitance must be charged and discharged with the periodic switching of the voltage at the diode, which leads to high short-circuit starting currents with a high capacitance.

SUMMARY OF THE INVENTION

It is therefore the object of the invention to further embody an electric circuit for the detuning of a resonant circuit in such manner that a detuning of the resonant circuit is possible in wide ranges.

This object is solved according to the invention by a circuit arrangement comprising a resonant circuit including an inductively acting electric circuit, a capacitively acting discharging device for discharging a free-wheel current of the inductively acting electric circuit, and a detuning device for changing the at least one resonant frequency. According to the invention it was recognized that the resonant circuit can be detuned in wide ranges, if the detuning device is disposed at least partially in series to the discharging device. The quality and the resonant frequency of the resonant circuit can be set in wide ranges, without boundary conditions having to be observed, as is the case in the prior art.

An embodiment of the detuning device such that the resonant circuit has a reduced quality leads to a higher attenuation of the resonant circuit, so that oscillations can quickly decay or do not arise at all.

When the detuning device comprises an inductive component arranged in series to the discharging device, the inductance of the inductive component leads to an effective detuning of the at least one resonant frequency.

For low frequencies an inductive component consisting of a ferrite material has a purely inductive behavior, which at higher frequencies is superimposed by a behavior that is intrinsic to an ohmic resistor. Such a selective behavior of the inductive component is in particular advantageous, if the inductively acting electric circuit comprises a switching regulator.

An embodiment of the inductive component formed as a ferrite bead is cost-efficient.

Another embodiment of the circuit arrangement further comprises a limiting device arranged parallel to the discharging device and the inductive component, for limiting an induction voltage caused by the inductive component. This permits a limitation of undesired induced overvoltages, which occur in consequence of the inductive component.

A limiting device that comprises an ohmic resistor in series with a diode permits an effective limitation of overvoltages, while the quality of the resonant circuit is essentially not affected. By a detuning device that comprises an ohmic resistor connected in series with a capacitor provided in the resonant circuit, the quality of the resonant circuit can be set in a very wide range.

With an inductively acting electric circuit comprising a switching regulator, the advantages of the detuning device particularly come into play, because due to the periodic switching, without detuning the resonant circuit, the switching regulator would constantly excite the resonant circuit.

With a discharging device embodied as a free-wheeling diode, the detuning device is very effective, since free-wheeling diodes comprise capacitances, which in particular with the inductance of a switching regulator form resonant frequencies, which are induced or excited by the switching regulator and are very disturbing.

BRIEF DESCRIPTION OF THE DRAWINGS

Examples of embodiments of the invention will become apparent from the following drawings, in which FIG. 1 shows an electric circuit in accordance with a first example of embodiment of the invention, and FIG. 2 shows an electric circuit in accordance with a second example of embodiment of the invention.

DETAILED DESCRIPTION OF EXAMPLE EMBODIMENTS OF THE INVENTION

FIG. 1 shows an electric circuit 1 for the detuning of a resonant circuit. The electric circuit 1 comprises a switching regulator 2, which is formed for example as a buck converter or a boost converter. The switching regulator 2 comprises three inputs. A first input 3 is connected via an ohmic pre-resistor 4 to a circuit input 5. The pre-resistor 4 has a resistance value $R_V$. An input voltage $U_E$ is applied to the circuit input 5. A second input 6 of the switching regulator 2 is directly connected to the circuit input 5, so that the input voltage $U_E$ is applied directly to the second input 6 of the switching regulator 2. A third input 7 of the switching regulator 2 is directly connected to a ground potential 8. At the input side the circuit 1 comprises a first smoothing capacitor 9, which is connected to the circuit input 5 and the ground potential 8 and which has a capacitance $C_V$. The ohmic pre-resistor 4 has a resistance value $R_V$ of 100 kΩ and the first smoothing capacitor 9 has a capacitance $C_V$ of 100 nF.

The switching regulator 2 further comprises an output 10, which is connected via a storage throttle 11 to a circuit output 12. The storage throttle 11 has an inductance $L_A$. The output voltage $U_A$ is applied to the circuit output 12. At the output side the circuit 1 comprises a second smoothing capacitor 13, which is connected to the circuit output 12 and the ground potential 8 and which has a capacitance $C_A$. The inductance $L_A$ of the storage throttle 11 is 68 µH and the capacitance $C_A$ of the second smoothing capacitor 9 is 100 ΞF.

At the output side, the circuit 1 comprises a capacitively acting discharging device 15 for discharging a free-wheel current. The discharging device 15 is connected to the output 10 and the ground potential 8. The discharging device 15 is formed as a free-wheeling diode. In the following, the discharging device is called free-wheeling diode 15.

Considered in a process flow direction, the free-wheeling diode 15 is connected at the input side to the ground potential 8 and at the output side to the output 10 of the switching regulator 2. The free-wheeling diode 15 comprises a junction capacitance $C_S$ and a flow capacitance $C_D$, which cause the capacitive behavior of the free-wheeling diode. The switching regulator 2, the first smoothing capacitor 9 and the free-wheeling diode 15 form an inductively acting electric circuit 14, which comprises the inductances of the switching regulator 2, of the first smoothing capacitor 9 and of the free-wheeling diode 15 as well as the inductances not further described. The capacitances of the free-wheeling diode 15 together with the inductances of the electric circuit 14 form a resonant circuit, which comprises a resonant frequency $f_R$. The free-wheel current results from the inductive behavior of the electric circuit 14.

For changing the resonant frequency $f_R$ a detuning device 16 is provided. The detuning device 16 comprises an inductive component 17, which is disposed in series to the free-wheeling diode 15. Thus the inductive component 17 is electroconductively connected to the free-wheeling diode 15 and to the ground potential 8. The inductive behavior of the inductive component 17 can be described by an inductance $L_V$. The detuning device 16 is formed in such a manner that compared to the resonant circuit without the detuning device 16 the resonant circuit with the detuning device 16 comprises a reduced quality G, i.e. a higher attenuation D. This is achieved by the real part of the inductive component 17, which consists of a ferrite material and is formed as a ferrite bead, which encloses the connecting line between the free-wheeling diode 15 and the ground potential 8 not further described.

An only weak attenuated oscillation results when closing the resonant circuit by the switching regulator 2 without the detuning device 16. The resonant circuit is formed in this case by the closed switching regulator 2, the first smoothing capacitor 9 and the free-wheeling diode 15.

Due to the ferrite material the inductive component 17 shows for low frequencies a purely inductive behavior, which in case of higher frequencies is superimposed by an ohmic behavior. The resonant frequency of the resonant circuit is detuned by the inductive behavior, so that the resonant circuit is not longer induced by the switching of the switching regulator 2. Further, the quality G of the resonant circuit is strongly reduced by the ohmic behavior, strongly attenuating the resonant circuit, so that it can no longer swing with higher frequencies between 100 MHz and 100 MHz. The attenuation D of the resonant circuit is such high that this is a so-called aperiodic decaying case. In the complex frequency level this means that the originally conjugated complex zeroes of the transfer function of the resonant circuit without the detuning device 16 moved to the real axis by the ohmic behavior of the detuning device 16. The resonant circuit is thus attenuated in such strong manner that it is no longer able to swing.

FIG. 2 shows a further embodiment of the electric circuit 1 according to the invention. To support the internal charging pump, the switching regulator 2 comprises a second output 18, which is connected via a third capacitor 19, which is also called a boot strap capacitor, to the first output 10. For the limitation of an induction voltage caused by the inductive component 17, a limiting device 20 is provided, which is arranged parallel to the free-wheeling diode 15 and the inductive component 17. The limiting device 20 has a diode 21 and an ohmic resistor 22 arranged in series to the diode 21. The diode 21 is a low-capacitive small signal diode, whose capacitive behavior can be described by a capacitance $C_K$. The ohmic resistor 22 has a resistance value $R_K$, which results from the amount of a maximum allowable negative voltage $U_{max}$ at the output 10 of the switching regulator 2 and a current i by an inductance of the storage throttle 11 shortly before the switch-off time of the switching regulator 2 according to the following formula:

$$R_K \approx (U_{max} - U_D)/i,$$

wherein $U_D$ is a flow voltage of the diode 21.

The detuning device 16 further comprises an ohmic resistor 23, which is connected in series to the first smoothing capacitor 9 located in the resonant circuit. The ohmic resistor 23 has a resistance value $R_I$.

By means of the diode 21 induction voltages caused by the inductive component 17 are clipped. The capacitance $C_K$ of the diode 21 and the inductance $L_V$ of the inductive component 17 form a further resonant circuit, which is attenuated by means of the ohmic resistor 22. The ohmic resistor 22 simultaneously protects the diode 21 against destruction, if the flow voltage of the diode 21 is smaller than the flow voltage of the free-wheeling diode 15. The ohmic resistor 23 serves to further reduce the quality Q in case of low frequencies, if the inductive component 17 shows a purely inductive behavior.

The invention claimed is:

1. A circuit arrangement for detuning a resonant circuit, comprising:
    an inductively acting electric circuit,
    a capacitively acting discharging device for discharging a free-wheel current of the electric circuit, wherein the electric circuit and the discharging device form a resonant circuit with at least one resonant frequency,
    a detuning device comprising an inductive component arranged in series to the discharging device for changing the at least one resonant frequency, and
    a limiting device arranged parallel to the discharging device and the inductive component for limiting an induction voltage caused by the inductive component.

2. The circuit arrangement according to claim 1, wherein the detuning device is effective to reduce a quality of the resonant circuit.

3. The circuit arrangement according to claim 1, wherein the inductive component consists of a ferrite material.

4. The circuit arrangement according to claim 1, wherein the inductive component is formed as a ferrite bead.

5. The circuit arrangement according to claim 1, wherein the limiting device comprises a diode and an ohmic resistor arranged in series to the diode.

6. The circuit arrangement according to claim 1, wherein the discharging device comprises a free-wheeling diode.

7. A circuit arrangement for detuning a resonant circuit, comprising:
    an inductively acting electric circuit,
    a capacitor, a capacitively acting discharging device for discharging a free-wheel current of the electric circuit, wherein the electric circuit, the capacitor and the discharging device form a resonant circuit with at least one resonant frequency, and a detuning device for changing the at least one resonant frequency, wherein the detuning device comprises an ohmic resistor connected in series to the capacitor, and wherein the detuning device is further arranged at least partially in series to the discharging device.

8. The circuit arrangement according to claim 7, wherein the detuning device is effective to reduce a quality of the resonant circuit.

9. The circuit arrangement according to claim 7, wherein the detuning device further comprises an inductive component arranged in series to the discharging device.

10. The circuit arrangement according to claim 9, wherein the inductive component consists of a ferrite material.

11. The circuit arrangement according to claim 9, wherein the inductive component is formed as a ferrite bead.

12. The circuit arrangement according to claim 7, wherein the inductively acting electric circuit comprises a switching regulator.

13. The circuit arrangement according to claim 7, wherein the discharging device comprises a free-wheeling diode.

14. A circuit arrangement for detuning a resonant circuit, comprising:

an inductively acting electric circuit that comprises a switching regulator, a capacitively acting discharging device for discharging a free-wheel current of the electric circuit, wherein the electric circuit and the discharging device form a resonant circuit with at least one resonant frequency, and a detuning device for changing the at least one resonant frequency, wherein the detuning device is arranged at least partially in series to the discharging device.

15. The circuit arrangement according to claim 14, wherein the detuning device is effective to reduce a quality of the resonant circuit.

16. The circuit arrangement according to claim 14, wherein the detuning device comprises an inductive component arranged in series to the discharging device.

17. The circuit arrangement according to claim 16, wherein the inductive component consists of a ferrite material.

18. The circuit arrangement according to claim 16, wherein the inductive component is formed as a ferrite bead.

19. The circuit arrangement according to claim 14, wherein the discharging device comprises a free-wheeling diode.

* * * * *